(12) United States Patent
Chun et al.

(10) Patent No.: US 12,026,233 B2
(45) Date of Patent: Jul. 2, 2024

(54) SYSTEM AND METHOD FOR EVALUATING CAMOUFLAGE PATTERN BASED ON IMAGE ANALYSIS

(71) Applicant: KOREA PHOTONICS TECHNOLOGY INSTITUTE, Gwangju (KR)

(72) Inventors: Sung Kuk Chun, Gwangju (KR); Hoe Min Kim, Gwangju (KR); Jeong Rok Yun, Gwangju (KR); Un Yong Kim, Gwangju (KR)

(*) Notice: Subject to any disclaimer, the term of this patent is extended or adjusted under 35 U.S.C. 154(b) by 374 days.

(21) Appl. No.: 17/499,456

(22) Filed: Oct. 12, 2021

(65) Prior Publication Data
US 2022/0164596 A1 May 26, 2022

(30) Foreign Application Priority Data
Nov. 23, 2020 (KR) .......................... 10-2020-0157570

(51) Int. Cl.
*G06F 18/22* (2023.01)
*G06N 3/04* (2023.01)
(Continued)

(52) U.S. Cl.
CPC ............... *G06F 18/22* (2023.01); *G06N 3/04* (2013.01); *G06N 3/08* (2013.01); *G06T 7/0002* (2013.01);
(Continued)

(58) Field of Classification Search
None
See application file for complete search history.

(56) References Cited

U.S. PATENT DOCUMENTS

2005/0254456 A1* 11/2005 Sakai ................... H04L 1/1835
714/701

FOREIGN PATENT DOCUMENTS

KR 10-2020-0002066 1/2020

OTHER PUBLICATIONS

Bai, X., Liao, N., & Wu, W. (2020). Assessment of camouflage effectiveness based on perceived color difference and gradient magnitude. Sensors, 20(17), 4672. (Year: 2020).*

(Continued)

*Primary Examiner* — Samah A Beg
(74) *Attorney, Agent, or Firm* — ANTONIO HA & U.S. PATENT, LLC (57) ABSTRACT

According to an embodiment, a system comprises a communication module providing a communication interface, a camouflage pattern evaluation module performing an artificial intelligence-based camouflage pattern evaluation algorithm on an operation environment image and a camouflage pattern image, analyzing a similarity between the operation environment image and the camouflage pattern image, and obtaining an evaluation result of camouflage performance for the camouflage pattern in the operation environment, and a processor deriving a quantitative camouflage performance value for the evaluation result. The artificial intelligence-based camouflage performance evaluation algorithm extracts feature information for the operation environment image and the camouflage pattern image and analyzes the similarity in color, pattern, or structure between the operation environment image and the camouflage pattern image based on the extracted feature information.

8 Claims, 7 Drawing Sheets

(51) Int. Cl.
  *G06N 3/08* (2023.01)
  *G06T 7/00* (2017.01)
  *G06T 7/90* (2017.01)
  *G06V 10/32* (2022.01)
  *G06V 10/44* (2022.01)
  *G06V 10/56* (2022.01)

(52) U.S. Cl.
  CPC ............... *G06T 7/90* (2017.01); *G06V 10/32* (2022.01); *G06V 10/44* (2022.01); *G06V 10/56* (2022.01); *G06T 2207/10024* (2013.01); *G06T 2207/20084* (2013.01); *G06T 2207/30212* (2013.01)

(56) References Cited

OTHER PUBLICATIONS

Fan, D. P., Cheng, M. M., Liu, Y., Li, T., & Borji, A. (2017). Structure-measure: A new way to evaluate foreground maps. In Proceedings of the IEEE international conference on computer vision (pp. 4548-4557). (Year: 2017).*

Song, L., & Geng, W. (2010, October). A new camouflage texture evaluation method based on WSSIM and nature image features. In 2010 International conference on multimedia technology (pp. 1-4). IEEE. (Year: 2010).*

Zujovic, J., Pappas, T. N., & Neuhoff, D. L. (2013). Structural texture similarity metrics for image analysis and retrieval. IEEE Transactions on Image Processing, 22(7), 2545-2558. (Year: 2013).*

English Specification of 10-2020-0002066.

"Assessment of Camouflage Effectiveness Based on Perceived Color Difference and Gradient Magnitude", Xueqiong Bai et al., Received: Jun. 22, 2020; Accepted: Aug. 16, 2020; Published: Aug. 19, 2020, Sensors 2020, 20, 4672; doi: 10.3390/s20174672.

"Similarity analysis of fashion image with color, style, and pattern based on VGG-19 model and histogram", Jeong-Ho Shin et al., KCC2018, Jun. 2018, 2,101-2, 103 (3 pages).

English translation of ""Similarity analysis of fashion image with color, style, and pattern based on VGG-19 model and histogram", Jcong-Ho Shin ct al., KCC2018, Jun. 2018, 2,101-2,103 (3 pages)".

* cited by examiner

SYSTEM AND METHOD FOR EVALUATING CAMOUFLAGE PATTERN BASED ON IMAGE ANALYSIS

CROSS-REFERENCE TO RELATED APPLICATION(S)

This application is based on and claims priority under 35 U.S.C. 119 to Korean Patent Application No. 10-2020-0157570, filed on Nov. 23, 2020, in the Korean Intellectual Property Office, the disclosure of which is herein incorporated by reference in its entirety.

TECHNICAL FIELD

The disclosure relates to a camouflage pattern evaluation technique for evaluating the camouflage performance of a camouflage pattern.

DESCRIPTION OF RELATED ART

The description of the Discussion of Related Art section merely provides information that may be relevant to embodiments of the disclosure but should not be appreciated as necessarily constituting the prior art.

Military weapons may be camouflaged. Military camouflage is the use of camouflage by a military force to protect personnel and equipment from observation by enemy forces Realizing the necessity of such camouflage, the military has prepared a number of concealment functions for materials, equipment and facilities used in the military.

In particular, to conceal military structures, military facilities, or ground weapon systems, the military has conventionally camouflage patterns with paint. However, the painted patterns may be easily scratched or erased by an external physical impact and discolored or peeled off over time.

The camouflage pattern is used to maximize the camouflage function of soldiers and weapon systems by simulating the colors and patterns of the surrounding environment during operation and thus minimize damage to lives and facilities.

Recently, as the military operational environment and missions are complicated and diversified, a need arises for research and development to simply create camouflage patterns optimized for the battlefield environment and to evaluate the camouflage performance of pre-created camouflage patterns.

Camouflage patterns are used to reduce detection probability and to obstruct aiming. However, the conventional camouflage technology using previously defined camouflage patterns focuses only on aiming obstruction. The conventional art relies heavily on the high contrast effect of colors with large differences in brightness, saturation, and hue and relatively simple patterns. Therefore, conventional combat uniforms or equipment having conventional camouflage patterns suffer from reduced camouflage effect due to the absence of a quantitative analysis of the recent operational environment.

SUMMARY

According to an embodiment, to address the foregoing issues, an object of the disclosure is to receive an operation environment image and a camouflage pattern image and evaluate whether the camouflage performance of the camouflage pattern in the operation environment is appropriate using artificial intelligence-based image analysis.

However, the objects of the embodiments are not limited thereto, and other objects may also be present.

According to an embodiment, a system for evaluating a camouflage pattern based on image analysis comprises a communication module providing a communication interface interworking with a communication module to provide a transmission/reception signal in a packet data form, a camouflage pattern evaluation module performing an artificial intelligence-based camouflage pattern evaluation algorithm on an operation environment image of an operation environment and a camouflage pattern image of a camouflage pattern received through the communication module, analyzing a similarity between the operation environment image and the camouflage pattern image, and obtaining an evaluation result of camouflage performance for the camouflage pattern in the operation environment, and a processor deriving and providing a quantitative camouflage performance value for the evaluation result of the camouflage performance obtained by the camouflage pattern evaluation module. The artificial intelligence-based camouflage performance evaluation algorithm extracts feature information for the operation environment image and the camouflage pattern image and analyzes the similarity in color, pattern, or structure between the operation environment image and the camouflage pattern image based on the extracted feature information.

According to an embodiment, the camouflage pattern evaluation module may include an image input unit receiving the operation environment image and the camouflage pattern image, an image preprocessor preprocessing the operation environment image and the camouflage pattern image through correction and normalization, a similarity analyzer analyzing similarities in color, pattern, and structure between the operation environment image and the camouflage pattern image preprocessed by the image preprocessor, and a result providing unit averaging the similarities in color, pattern, and structure between the operation environment image and the camouflage pattern image, calculating a weighted sum, and providing the evaluation result of the camouflage performance.

According to an embodiment, the similarity analyzer may include a color similarity analyzer calculating a color similarity by performing color comparison on each pixel between the operation environment image and the camouflage pattern image, a pattern similarity analyzer calculating a pattern similarity by performing comparison on a color distribution in each space between the operation environment image and the camouflage pattern image, and a structural similarity analyzer extracting respective structural feature vectors of the operation environment image and the camouflage pattern image using a deep learning-based object recognition algorithm and calculating a structural similarity between the extracted structural feature vectors.

According to an embodiment, the camouflage pattern evaluation module scans the entire operation environment image using a sliding window scheme and calculates the similarity between the operation environment image and the camouflage pattern image for each sliding window.

According to an embodiment, the camouflage pattern evaluation module repeats the calculation of the similarity between the operation environment image and the camouflage pattern image for each sliding window while resizing the sliding window by a preset increment or decrement.

According to an embodiment, a method for evaluating a camouflage pattern based on image analysis performed by an image analysis system comprises receiving an operation environment image of an operation environment and a camouflage pattern image of a camouflage pattern, performing preprocessing on the operation environment image and the camouflage pattern image through correction and normalization, analyzing a similarity between the operation environment image and the camouflage pattern image using an artificial intelligence-based camouflage performance evaluation algorithm, and deriving and providing a quantitative camouflage performance value for an evaluation result of a camouflage performance for the camouflage pattern in the operation environment. The artificial intelligence-based camouflage performance evaluation algorithm extracts feature information for the operation environment image and the camouflage pattern image and analyzes the similarity in color, pattern, or structure between the operation environment image and the camouflage pattern image based on the extracted feature information.

According to an embodiment, performing the preprocessing may include converting the operation environment image and the camouflage pattern image, represented as red-green-blue (RGB) color space data, into XYZ color space data, and converting the XYZ color space data into Lab color space data.

According to an embodiment, analyzing the similarity may include a color similarity analysis step calculating a color similarity by performing color comparison on each pixel between the operation environment image and the camouflage pattern image, a pattern similarity analysis step calculating a pattern similarity by performing comparison on a color distribution in each space between the operation environment image and the camouflage pattern image, and a structural similarity analysis step extracting respective structural feature vectors of the operation environment image and the camouflage pattern image using a deep learning-based object recognition algorithm and calculating a structural similarity between the extracted structural feature vectors.

According to an embodiment, the color similarity analysis step may include measuring the color similarity by converting the operation environment image and the camouflage pattern image, represented as RGB color space data, into Lab color space data and then calculating a color difference based on a preset color difference equation between pixels matching between the operation environment image and the camouflage pattern image in the Lab color space data.

According to an embodiment, the pattern similarity analysis step may include measuring a degree of reflection of a color distribution of the camouflage pattern image as compared with the operation environment image using any one index of a structural similarity index measure (SSIM) or a multiple SSIM (MSSIM) for measuring a structural similarity index.

According to an embodiment, the deep learning-based object recognition algorithm used in the structural similarity analysis step uses a convolutional neural network (CNN) including a visual geometry group network (VGGNET) and a residual network (ResNET). The deep learning-based object recognition algorithm extracts respective feature maps of the operation environment image and the camouflage pattern image and compares the extracted feature maps through a Frobenius norm to measure the structural similarity between the operation environment image and the camouflage pattern image.

According to an embodiment, deriving and providing the quantitative camouflage performance value may include deriving and providing the quantitative camouflage performance value by multiplying each of similarities in color, pattern, or structure of the evaluation result of the camouflage performance by a preset weight and summating the weight-multiplied similarities.

According to the embodiments of the disclosure, it is possible to quantitatively evaluate the camouflage performance of a specific camouflage pattern in a specific operation environment using artificial intelligence-based image analysis and to simply generate a camouflage pattern optimized for the operation environment or to quickly evaluate the camouflage performance of a previously created camouflage pattern.

Further, according to the embodiments of the disclosure, it is possible to maximize the camouflage function of soldiers or facilities by simulating the color and pattern of the ambient environment during (military) operation, thus minimizing damage to lives or facilities. It is also possible to quickly and precisely evaluate the camouflage performance of a camouflage pattern in diversified operation environments, thus leading to cost savings in determining or adopting a camouflage pattern.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the disclosure may be implemented in other various forms and is not limited to the embodiments set forth herein. For clarity of the disclosure, irrelevant parts are removed from the drawings, and similar reference denotations are used to refer to similar elements throughout the specification.

In embodiments of the disclosure, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

In the disclosure, the term 'terminal' or 'terminal device' may refer to a wireless communication device with portability and mobility, and may be any kind of handheld wireless communication device, such as a smart phone, a tablet PC, or a laptop computer. The term 'terminal' or 'terminal device' may refer to a wired communication device, such as a personal computer (PC) that may access other terminals or servers using a network. Here, the network means a connection structure capable of exchanging information between nodes, such as a plurality of terminals or servers, and examples of the network include local area networks (LANs), wide area networks (WANs), internet (world wide web (WWW)), wired/wireless data communication networks, telephony networks, or wired/wireless television communication networks.

Examples of wireless data communication networks may include, but are not limited to, 3G, 4G, 5G, 3rd generation partnership project (3GPP), long term evolution (LTE), world interoperability for microwave access (WIMAX), Wi-Fi, Bluetooth communication, infrared communication, ultrasound communication, visible light communication (VLC), and Li-Fi.

Example embodiments are described below for a better understanding of the disclosure, but the disclosure is not limited thereto. Therefore, it should be noted that any embodiment performing substantially the same function as the embodiments disclosed herein belong to the scope of the disclosure.

The components, processes, steps, or methods according to embodiments of the disclosure may be shared as long as they do not technically conflict with each other.

Hereinafter, embodiments of the disclosure are described in detail with reference to the accompanying drawings.

Figure 1:
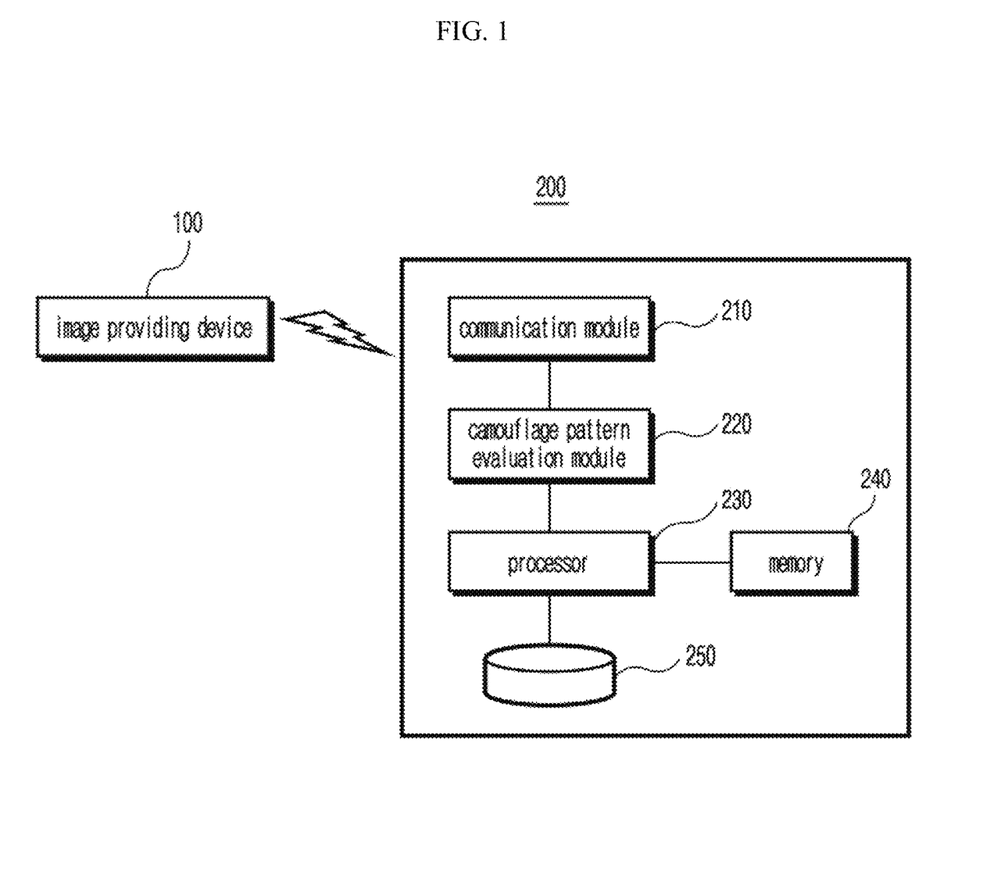
FIG. 1 is a block diagram illustrating a configuration of an image analysis-based camouflage pattern evaluation system according to an embodiment of the disclosure.

FIG. 1 is a block diagram illustrating a configuration of an image analysis-based camouflage pattern evaluation system according to an embodiment of the disclosure.

Referring to FIG. 1, an image analysis-based camouflage pattern evaluation system may include, but is not limited to, a communication module 210, a camouflage pattern evaluation module 220, a memory 240, a processor 230, and a database 250.

The communication module 210 provides a communication interference necessary to interwork with a communication network to transmit/receive signals, e.g., packets, to/from an image providing device 100. The communication module 210 may receive a data request from a user terminal and may transmit data in response to the data request. The communication module 210 may be a device including hardware or software necessary to transmit/receive signals such as control signals or data signals via wired/wireless communication with other network devices.

Here, the user terminal may request to evaluate a camouflage pattern or may input a camouflage pattern (or camouflage pattern image) or an operation site image to be evaluated.

If the communication module 210 receives an operation environment image (or operation site image) and a camouflage pattern image, the camouflage pattern evaluation module 220 performs an artificial intelligence (AI)-based camouflage performance evaluation algorithm to analyze the similarity between the operation environment image and the camouflage pattern image, thereby evaluating the camouflage performance of the camouflage pattern for the operation environment. The artificial intelligence-based camouflage performance evaluation algorithm extracts feature information for the operation environment image and the camouflage pattern image and analyzes the similarity in color, pattern or structure between the operation environment image and the camouflage pattern image based on the extracted feature information.

The memory 240 stores a program for performing an image analysis-based camouflage pattern evaluation method including the artificial intelligence-based camouflage performance evaluation algorithm. Further, the memory 240 stores data processed by the processor 230 temporarily or permanently. The memory 240 may include, but is not limited to, volatile storage media or non-volatile storage media.

The processor 230 controls the entire process of providing the image analysis-based camouflage pattern evaluation method. The processor 230 may derive a quantitative camouflage performance value, calculated, for the result of evaluation of the camouflage performance and output the quantitative camouflage performance value on the screen or provide the quantitative camouflage performance value to the user terminal.

The processor 170 may include any kind or type of device capable of processing data. As used herein, 'processor' may refer to a data processing device embedded in hardware and having a physically structured circuit to perform functions represented in codes or commands included in the program. Examples of the data processing device embedded in hardware may include microprocessors, central processing units (CPUs), processor cores, multi-processors, application-specific integrated circuits (ASICs), field programmable gate arrays (FPGAs), or other processing devices, but the scope of the disclosure is not limited thereto.

The database 250 stores data accumulated while performing the image analysis-based camouflage pattern evaluation method. For example, the database 250 may store, e.g., the operation environment image, the camouflage pattern image, the evaluation result of camouflage performance, or the quantitative camouflage performance value.

Figure 2:
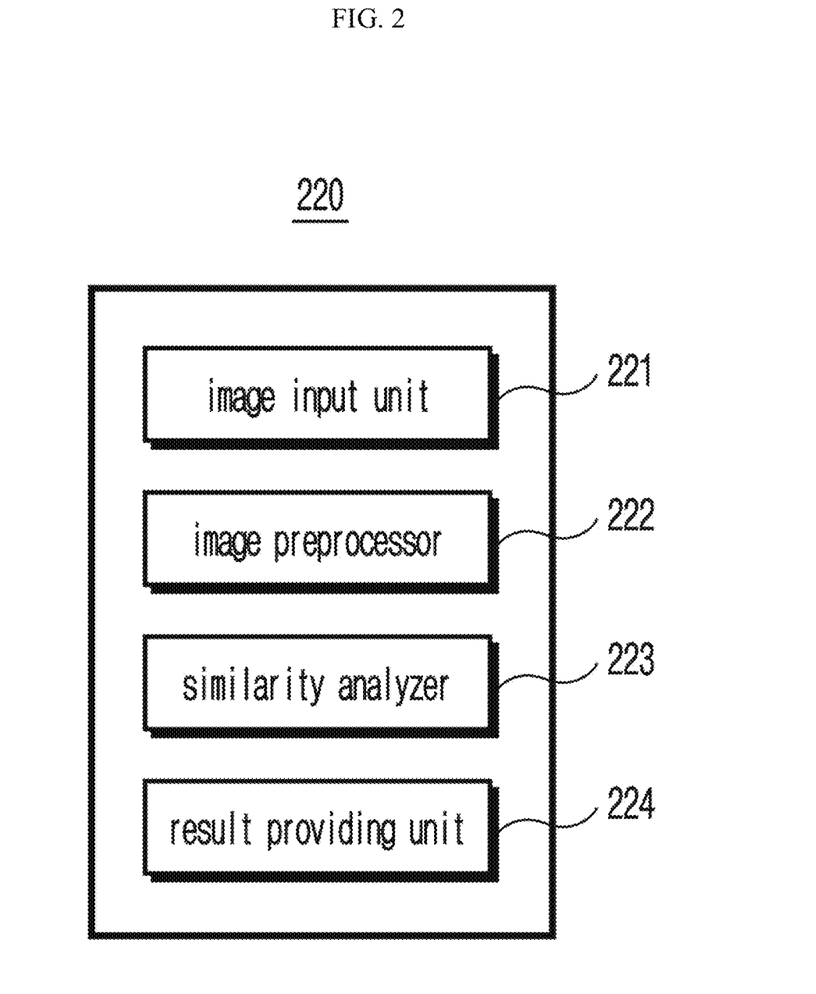
FIG. 2 is a block diagram illustrating a configuration of a camouflage pattern evaluation module according to an embodiment of the disclosure.
Figure 3:
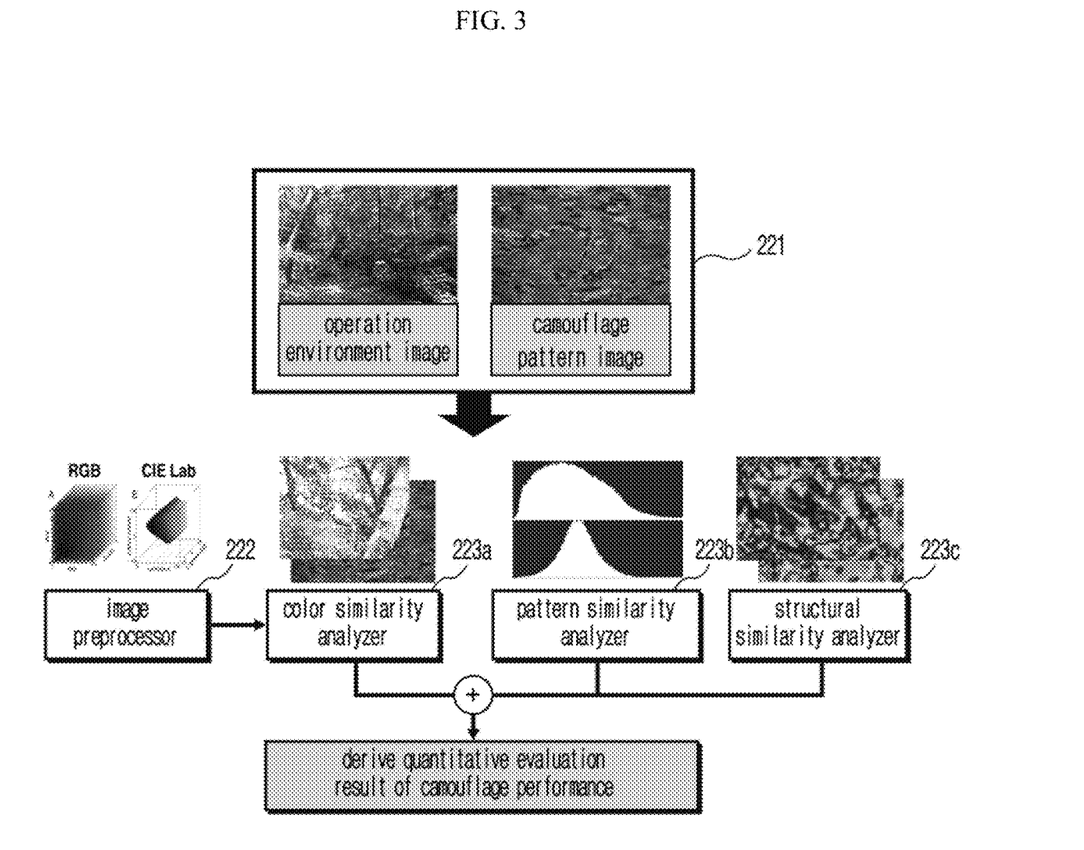
FIG. 3 is a view illustrating functions of a camouflage pattern evaluation module according to an embodiment of the disclosure.

FIG. 2 is a block diagram illustrating a configuration of a camouflage pattern evaluation module according to an embodiment of the disclosure. FIG. 3 is a view illustrating functions of a camouflage pattern evaluation module according to an embodiment of the disclosure.

Referring to FIGS. 2 and 3, the camouflage pattern evaluation module 220 includes an image input unit 221, an image preprocessor 222, a similarity analyzer 223, and a result providing unit 224.

The image input unit 221 receives an operation environment image and a camouflage pattern image. The operation environment image may be still image or video data having a format of, e.g., BMP, JPG, PNG, MP4, or AVI, captured (or recorded or obtained) during the day or night. The camouflage pattern image may be still image data having a format of, e.g., BMP, JPG, or PNG, captured or obtained for a camouflage pattern to be evaluated (i.e., an evaluation target).

The image preprocessor 222 performs preprocessing, such as, e.g., correction and normalization, on the operation environment image and the camouflage pattern image. The image preprocessor 222 performs color space conversion to reduce color space errors.

The operation environment image and camouflage pattern image are represented in RGB color space. Accordingly, the image preprocessor 222 converts the color representation of each pixel in the image into the Lab color space, which is a color space based on a human color recognition process. The Lab color space is device-independent, unlike RGB and CMYK color spaces where colors vary depending on display equipment or print media. Therefore, the color difference equation in the Lab color space is capable of color difference calculation with less distortion using CIEDE2000 while considering human color perception, thereby reducing color space errors.

The similarity analyzer 223 analyzes the similarity in color, pattern, and structure between the operation environment image and the camouflage pattern image preprocessed by the image preprocessor 222. The similarity analyzer may include a color similarity analyzer 223a, a pattern similarity analyzer 223b, and a structural similarity analyzer 223c.

The color similarity analyzer 223a calculates the color similarity by performing color comparison on each pixel between the operation environment image and the camouflage pattern image. The pattern similarity analyzer 223b calculates the pattern similarity by performing comparison on the color distribution in each space between the operation environment image and the camouflage pattern image. The structural similarity analyzer 223c may extract the respective structural feature vectors of the operation environment image and the camouflage pattern image using a deep learning-based object recognition algorithm and compares the extracted structural feature vectors of the images using the Frobenius norm to thereby calculate the structural similarity between the two images.

The result providing unit 224 averages the similarities of color, pattern, and structure between the operation environment image and the camouflage pattern image analyzed by the similarity analyzer 223 and then calculates a weighted sum and provides the evaluation result of the camouflage performance.

Figure 4:
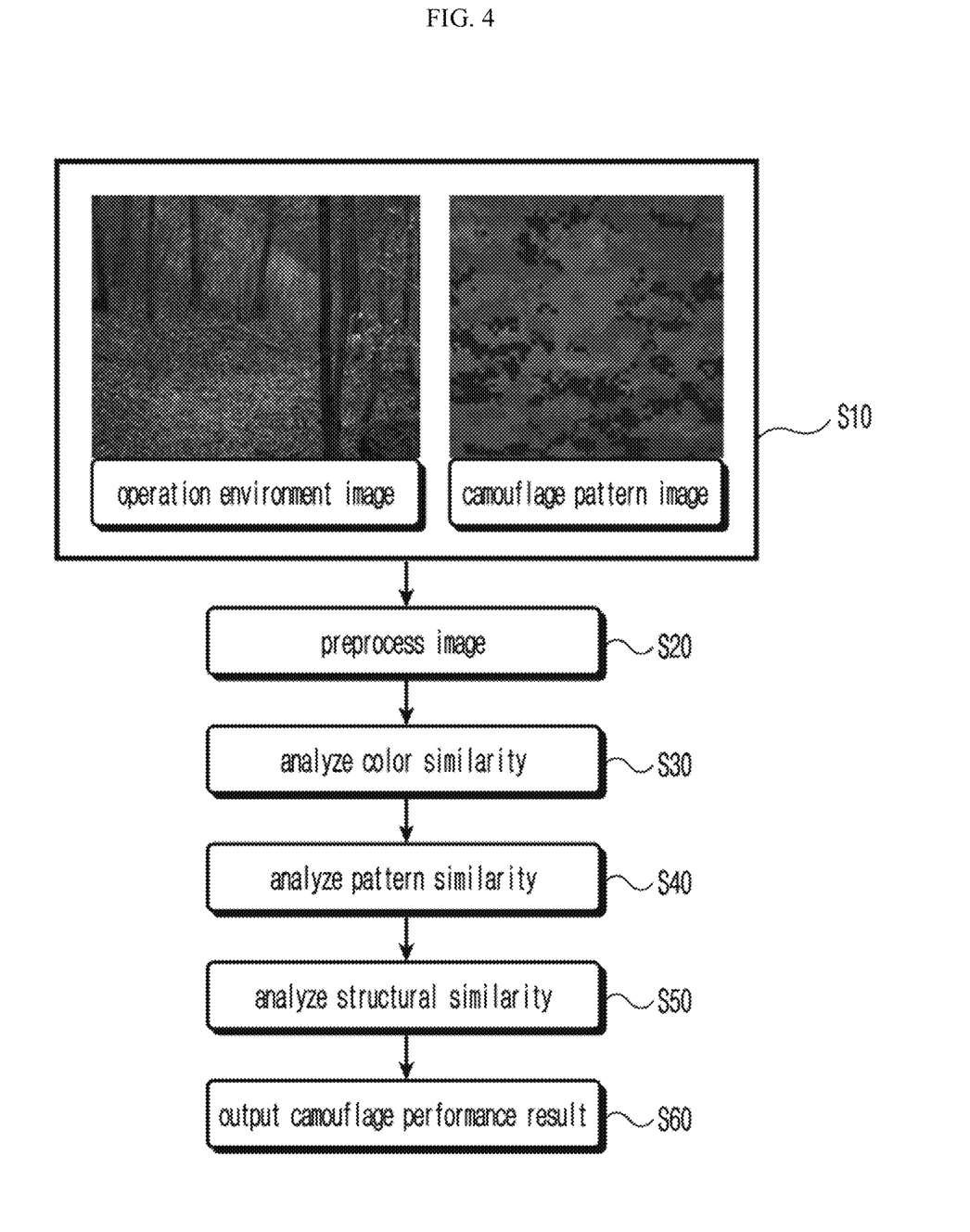
FIG. 4 is a flowchart illustrating an image analysis-based camouflage pattern evaluation method according to an embodiment of the disclosure.

FIG. 4 is a flowchart illustrating an image analysis-based camouflage pattern evaluation method according to an embodiment of the disclosure.

Referring to FIG. 4, if an operation environment image and a camouflage pattern image are received (S10), the camouflage pattern evaluation module 220 performs preprocessing of color space conversion to reduce a color space error (S20).

For example, the camouflage pattern evaluation module 220 converts the operation environment image and the camouflage pattern image represented as RGB color space data into the following XYZ color space data using Equation 1 below, and the camouflage pattern evaluation module 220 converts the converted XYZ color space data into Lab color space data using Equation 2 below.

$$\begin{bmatrix} X \\ Y \\ Z \end{bmatrix} \leftarrow \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R \\ G \\ B \end{bmatrix} \quad \text{[Equation 1]}$$

-continued $$X \leftarrow X/X_n, \text{ where } X_n = 0.950456 \quad \text{[Equation 2]}$$
$$Z \leftarrow Z/Z_n, \text{ where } Z_n = 1.088754$$
$$L \leftarrow \begin{cases} 116 * Y^{1/3} - 16 & \text{for } Y > 0.008856 \\ 903.3 * Y & \text{for } Y \leq 0.008856 \end{cases}$$
$$a \leftarrow 500(f(X) - f(Y)) + delta$$
$$b \leftarrow 200(f(Y) - f(Z)) + delta$$

The camouflage pattern evaluation module 220 analyzes the similarity between the operation environment image and the camouflage pattern image using an artificial intelligence-based camouflage performance evaluation algorithm. The camouflage pattern evaluation module 220 performs a color similarity analysis step S30 of calculating the color similarity by performing color comparison on each pixel between the operation environment image and the camouflage pattern image, a pattern similarity analysis step S40 of calculating the pattern similarity by performing comparison on the color distribution in each space between the operation environment image and the camouflage pattern image, and a structural similarity analysis step S50 of extracting the respective structural feature vectors of the operation environment image and the camouflage pattern image using a deep learning-based object recognition algorithm and calculating the structural similarity for the extracted structural feature vectors between the images.

In this case, the camouflage pattern evaluation module 220 may scan the entire operation environment image using a sliding window technique and calculates each of the color similarity, pattern similarity, and structural similarity between the operation environment image and the camouflage pattern image for each sliding window.

Further, the camouflage pattern evaluation module 220 repeats the step or process of calculating the similarity between the operation environment image and the camouflage pattern image for each sliding window while changing the size of the sliding window according to a preset increment or decrement. The camouflage pattern evaluation module 220 performs camouflage pattern performance evaluation calculation considering the camouflage pattern movement and perspective. The camouflage pattern evaluation module 220 calculates a weighted sum after averaging the color similarity, pattern similarity, and structural similarity calculated for each sliding window, thereby deriving an evaluation result of camouflage performance.

$$\text{Camouflage Effect}(E,C) = w_0 Clr(E,C) + w_1 Ptn(E,C) + w_2 Str(E,C) \quad \text{[Equation 3]}$$

In Equation 3, E is the daytime operation environment image, C is the camouflage pattern image, $w_i$ is the weight, Clr(E, C) is the color similarity, Ptn(E, C) is the pattern similarity, and Str(E, C) is the structural similarity.

The processor 230 derives and provides a quantitative camouflage performance value for the camouflage performance evaluation result of the camouflage pattern evaluation module 220 (S60).

Steps S10 to S60 of FIG. 4 may be divided into additional sub-steps or may be combined into fewer steps according to embodiments of the disclosure. Further, some of the steps may be omitted as necessary, or the order of the steps may be changed.

Figure 5:
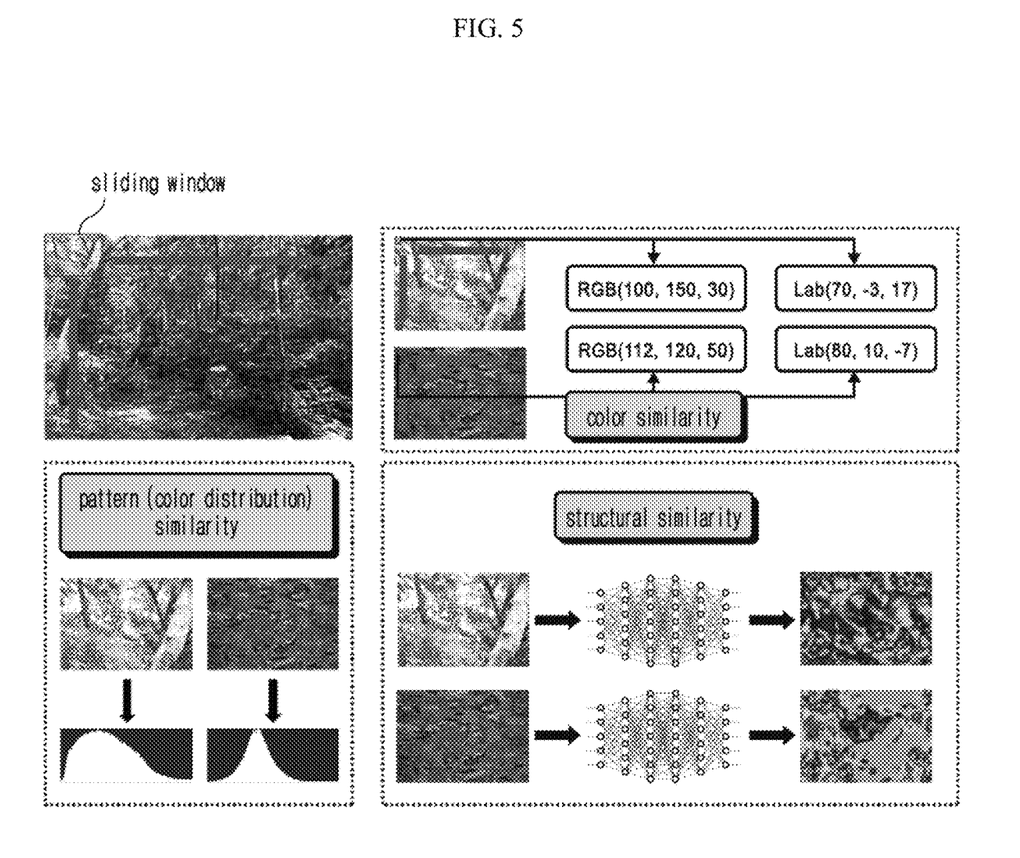
FIG. 5 is a view illustrating a similarity analysis process according to an embodiment of the disclosure.
Figure 6:
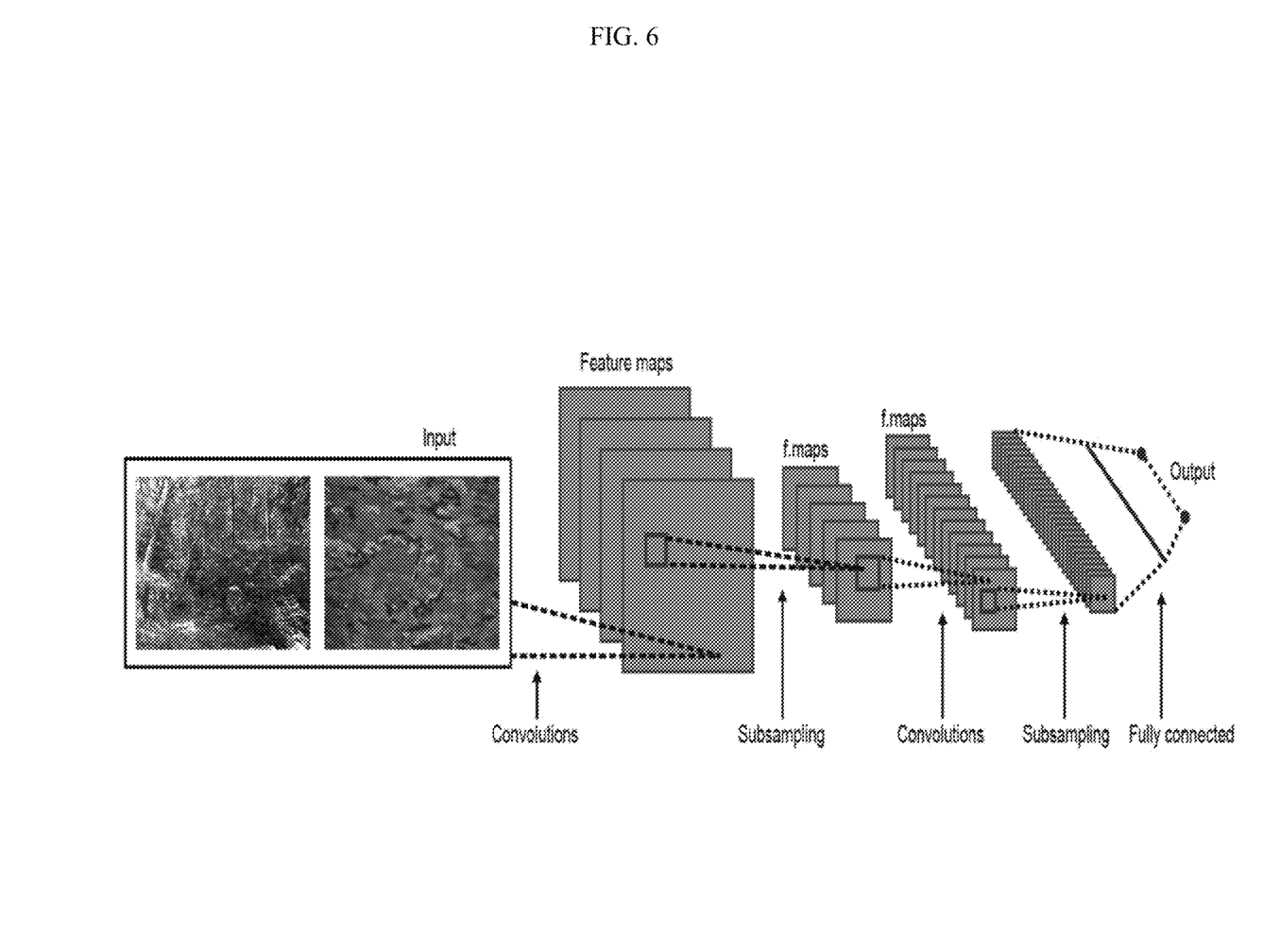
FIG. 6 is a view illustrating a CNN model applied to a deep learning-based object recognition algorithm according to an embodiment of the disclosure.
Figure 7:
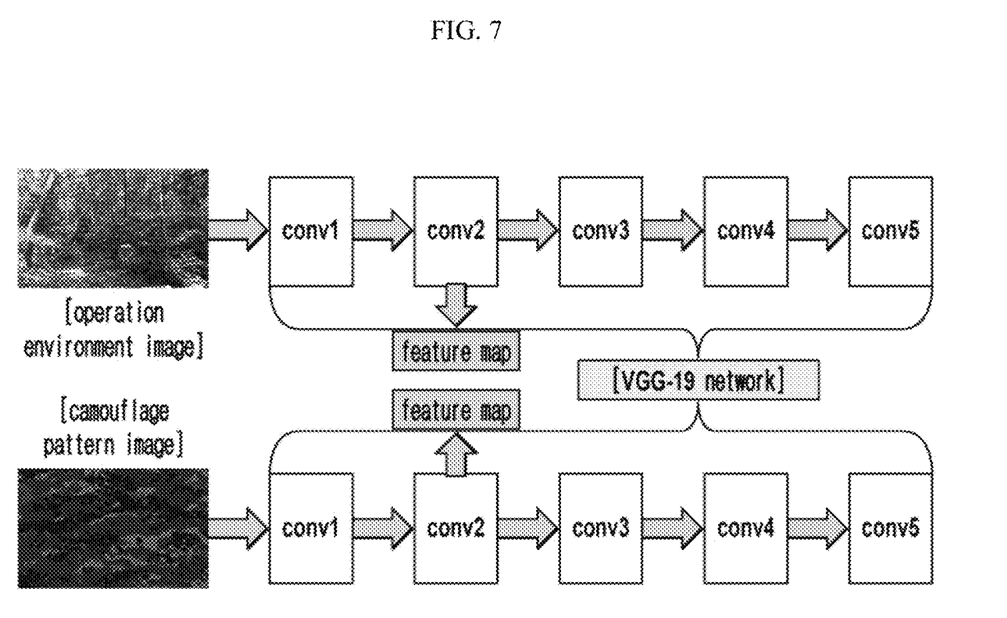
FIG. 7 is a view illustrating a process of extracting a feature map through a deep learning-based object recognition algorithm according to an embodiment of the disclosure.

FIG. 5 is a view illustrating a similarity analysis process according to an embodiment of the disclosure. FIG. 6 is a view illustrating a CNN model applied to a deep learning-based object recognition algorithm according to an embodiment of the disclosure. FIG. 7 is a view illustrating a process of extracting a feature map through a deep learning-based object recognition algorithm according to an embodiment of the disclosure.

Referring to FIGS. 5 to 7, the color similarity analyzer 223a measures the color similarity by calculating the color difference based on a preset color difference equation (e.g., CIED2000) between pixels matching between the operation environment image and the camouflage pattern image in the Lab color space according to Equation 4 below.

Color difference equations (or formulas) between the two color spaces, i.e., ($L_1^*, a_1^*, b_1^*$) and ($L_2^*, a_2^*, b_2^*$), which are converted Lab color spaces, may be Equations 4 to 13 below. $\Delta E$ is the difference in brightness, saturation, and hue in the L*a*b*L coordinates and is defined in the L*C*h*color space.

$$\Delta E_{00}^* = \sqrt{\left(\frac{\Delta L'}{k_L S_L}\right)^2 - \left(\frac{\Delta C'}{k_C S_C}\right)^2 - \left(\frac{\Delta H'}{k_H S_H}\right)^2 + R_T \frac{\Delta C'}{k_C S_C} \frac{\Delta H'}{k_H S_H}} \quad \text{[Equation 4]}$$

$$\Delta L' = L_2^* - L_1^* \quad \text{[Equation 5]}$$

$$C_1^* = \sqrt{a_1^{*2} + b_1^{*2}} \quad \text{[Equation 6]}$$

$$C_2^* = \sqrt{a_2^{*2} + b_2^{*2}} \quad \text{[Equation 7]}$$

$$\overline{L'} = \frac{L_1^* + L_2^*}{2} \quad \overline{C} = \frac{C_1^* + C_2^*}{2} \quad \text{[Equation 8]}$$

$$a_1' = a_1^* + \frac{a_1^*}{2}\left(1 - \sqrt{\frac{\overline{C}^7}{\overline{C}^7 + 25^7}}\right) \quad \text{[Equation 9]}$$

$$a_2' = a_2^* + \frac{a_2^*}{2}\left(1 - \sqrt{\frac{\overline{C}^7}{\overline{C}^7 + 25^7}}\right)$$

$$h_1' = a\tan2(b_1^*, a_1') \bmod 360°, \quad \text{[Equation 10]}$$
$$h_2' = a\tan2(b_2^*, a_2') \bmod 360°$$

$$\Delta h' = \begin{cases} h_2' - h_1' & |h_1' - h_2'| \le 180° \\ h_2' - h_1' + 360° & |h_1' - h_2'| > 180°, h_2' \le h_1' \\ h_2' - h_1' - 360° & |h_1' - h_2'| \le 180°, h_2' > h_1' \end{cases} \quad \text{[Equation 11]}$$

$$\Delta H' = \sqrt[2]{C_1' C_2'} \sin(\Delta h'/2), \quad \text{[Equation 12]}$$

$$\overline{H}' = \begin{cases} (h_1' - h_2')/2 & |h_1' - h_2'| \le 180° \\ (h_1' - h_2' + 360°)/2 & |h_1' - h_2'| > 180°, h_1' + h_2' < 360° \\ (h_1' - h_2' + 360°)/2 & |h_1' - h_2'| > 180°, h_1' + h_2' \ge 360° \end{cases}$$

$$T = 1 - 0.17\cos(\overline{H}' - 30°) + 0.24\cos(2\overline{H}') + \quad \text{[Equation 13]}$$
$$0.32\cos(3\overline{H}' + 6°) - 0.20\cos(4\overline{H}' + 63°)$$

$$S_L = 1 + \frac{0.015(\overline{L}' - 50)^2}{\sqrt{20 + (\overline{L}' - 50)^2}} \quad S_C = 1 + 0.045\overline{C}'$$

$$S_H = 1 + 0.015\overline{C}' T$$

$$R_T = -2\sqrt{\frac{\overline{C}^7}{\overline{C}^7 + 25^7}} \sin\left[60° \cdot \exp\left(-\left[\frac{\overline{H}' - 275°}{25°}\right]^2\right)\right]$$

In Equations 4 to 13, the hue rotation period ($R_T$) deals with the issue with the blue area at a color angle around 275°, and the neutral color correction addresses the perceptual uniformity issue while undergoing L*C*h-difference primed value, brightness compensation ($S_L$), color difference compensation ($S_C$), and tonal correction ($S_H$).

In this case, the color similarity analyzer 223a enlarges or reduces the size using the sliding window according to the preset increment or decrement. The color similarity analyzer 223a may measure the camouflage performance of the camouflage pattern according to movement and perspective through convolution of the converted camouflage pattern image with the operation environment image, by moving the camouflage pattern.

The pattern similarity analyzer 223b measures the degree of reflection of the camouflage pattern image relative to the operation environment image using any one index of the structural similarity index measure (SSIM) and multiple structural similarity index measure (MSSIM) for measuring the structural similarity index as shown in Equation 14 below.

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \quad \text{[Equation 14]}$$

In Equation 14, $\mu_x$ denotes the average color value of the operation environment image, $\mu_y$ denotes the average color value of the camouflage pattern image, $\sigma_x$ denotes the standard deviation of the operation environment image, $\sigma_y$ denotes the standard deviation of the camouflage pattern image, $\sigma_{xy}$ denotes the camouflage image color covariance, and $c_1$ and $c_2$ denote regularization thresholds.

MSSIM is a representative index used to compare image qualities, and is mainly used to measure the quality of color distribution reconstruction of an image, which is compressed (encoded) and then decompressed (decoded), as compared to the original image. The algorithm using MSSIM is an algorithm enhanced to be robust to image size changes, and MSSIM is an index proposed to overcome the disadvantages of peak signal-to-noise ratio (PSNR) and to measure the degree of structural reconstruction of the image. Therefore, the algorithm using MSSIM may be used as a measure to measure the degree of reflection of color distribution of the camouflage pattern image as compared to the operation environment image. In other words, the algorithm using MSSIM measures the distribution similarity in brightness (luminance), contrast, and structure between the original image and the reconstructed image. If the distribution of elements for the brightness (luminance), contrast, and structure of the camouflage pattern image are similar to the distribution of the operation environment image, the similarity has a high value.

The deep learning-based object recognition algorithm used in the structural similarity analysis step may be a convolutional neural network (CNN) including a visual geometry group network (VGGNET) and a residual (ResNET). As illustrated in FIG. 7, the deep learning-based object recognition algorithm uses a VGG-19 network, which exhibits excellent performance in object recognition, to build a previously trained deep learning neural network. Here, VGG-19 is a convolutional neural network (CNN) constituted of 19 layers.

The deep learning-based object recognition algorithm may input the operation environment image and the camouflage pattern image to the VGG-19 network and extracts the respective feature maps of the operation environment image and camouflage pattern image from the second layer, i.e., conv2, of the VGG-19 network. Thereafter, the deep learning-based object recognition algorithm compares the extracted feature maps using the Frobenius norm and measures the structural similarity between the operation environment image and the camouflage pattern image as shown in Equation 15.

$$\text{structural similarity} = \frac{1}{2}\sum_{i,j}(E_{ij} - C_{ij})^2 \qquad \text{[Equation 15]}$$

In Equation 15, $E_{ij}$ denotes the value of position j on the operation environment feature map in the filter of conv2_i, and $C_{ij}$ denotes the value of position j on the camouflage feature map in the filter of conv2_i.

As illustrated in FIG. 6, the deep learning-based object recognition algorithm may be a CNN including VGGNET and ResNET. A CNN generally has three types of layers.

The convolution layers divide the input image into several smaller images using a 3×3 or larger-size convolution filter and activation function and extract a feature map. The subsampling layers extract a feature map with an average or maximum value of values through the x×x filter to make the convolution feature map simpler and characteristic. The fully connected layers input the extracted feature values to the artificial neural network and upload them to a multidimensional vector space and classify them using matrix operation.

The deep learning-based object recognition algorithm classifies objects according to categories based on deep learning, then learns them, and automatically classifies which category of instance the newly given image is. Therefore, the deep learning-based object recognition algorithm gathers image data for the operation environment image and performs preprocessing to assign a corresponding label to each image. Further, the deep learning-based object recognition algorithm extracts the pixel-unit features of the image using a CNN model and then performs classification training based on the values and then allows the so-trained model to predict the category for a new history image. The deep learning-based object recognition algorithm may perform classification training, targeting tree types/colors, leaf types/colors, or ground types/colors that appear frequently in the operation environment.

The artificial intelligence-based camouflage performance evaluation algorithm evaluates the performance of the camouflage pattern in conjunction with the algorithm using MSSIM and deep learning-based object recognition algorithm which are algorithms for measuring the color similarity, pattern similarity, or structural similarity. The above-described algorithms are merely an embodiment for describing the disclosure and, without being limited thereto, various changes or modifications may be made thereto. Further, the above-described algorithms are stored in the memory 240 as a computer-readable recording medium that may be controlled by the processor 230. At least part of the algorithm may be implemented in software, firmware, hardware, or a combination of at least two or more thereof and may include a module, program, routine, command set, or process for performing one or more functions.

The above-described embodiments may be implemented in the form of recording media including computer-executable instructions, such as program modules. The computer-readable medium may be an available medium that is accessible by a computer. The computer-readable storage medium may include a volatile medium, a non-volatile medium, a separable medium, and/or an inseparable medium. The computer-readable storage medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

Although embodiments of the disclosure have been described with reference to the accompanying drawings, it will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the disclosure is defined by the appended claims rather than the described description of the embodiments and include all modifications or changes made to the claims or equivalents of the claims.

What is claimed is:

1. A system for evaluating a camouflage pattern based on image analysis, the system comprising:
   a communication module providing a communication interface interworking with a communication module to provide a transmission/reception signal in a packet data form;
   a camouflage pattern evaluation module performing an artificial intelligence-based camouflage pattern evaluation algorithm on an operation environment image of an operation environment and a camouflage pattern image of a camouflage pattern received through the communication module, analyzing a similarity between the operation environment image and the camouflage pattern image, and obtaining an evaluation result of camouflage performance for the camouflage pattern in the operation environment; and
   a processor deriving and providing a quantitative camouflage performance value for the evaluation result of the camouflage performance obtained by the camouflage pattern evaluation module, wherein the artificial intelligence-based camouflage performance evaluation algorithm extracts feature information for the operation environment image and the camouflage pattern image and analyzes the similarity in color, pattern, or structure between the operation environment image and the camouflage pattern image based on the extracted feature information, wherein the camouflage pattern evaluation module includes:
   an image input unit receiving the operation environment image and the camouflage pattern image;
   an image preprocessor preprocessing the operation environment image and the camouflage pattern image through correction and normalization;
   a similarity analyzer analyzing similarities in color, pattern, and structure between the operation environment image and the camouflage pattern image preprocessed by the image preprocessor; and
   a result providing unit averaging the similarities in color, pattern, and structure between the operation environment image and the camouflage pattern image, calculating a weighted sum, and providing the evaluation result of the camouflage performance, wherein the similarity analyzer includes:

a color similarity analyzer calculating a color similarity by performing color comparison on each pixel between the operation environment image and the camouflage pattern image;

a pattern similarity analyzer calculating a pattern similarity by performing comparison on a color distribution in each space between the operation environment image and the camouflage pattern image; and a structural similarity analyzer extracting respective structural feature vectors of the operation environment image and the camouflage pattern image using a deep learning-based object recognition algorithm and calculating a structural similarity between the extracted structural feature vectors, wherein the deep learning-based object recognition algorithm used in the structural similarity analyzer uses a convolutional neural network (CNN) including a visual geometry group network (VGGNET) and a residual network (ResNET), and wherein the deep learning-based object recognition algorithm extracts respective feature maps of the operation environment image and the camouflage pattern image and compares the extracted feature maps through a Frobenius norm to measure the structural similarity between the operation environment image and the camouflage pattern image.

2. The system of claim 1, wherein the camouflage pattern evaluation module scans the entire operation environment image using a sliding window scheme and calculates the similarity between the operation environment image and the camouflage pattern image for each sliding window.

3. The system of claim 2, wherein the camouflage pattern evaluation module repeats the calculation of the similarity between the operation environment image and the camouflage pattern image for each sliding window while resizing the sliding window by a preset increment or decrement.

4. A method for evaluating a camouflage pattern based on image analysis performed by an image analysis system, the method comprising:

receiving an operation environment image of an operation environment and a camouflage pattern image of a camouflage pattern; performing preprocessing on the operation environment image and the camouflage pattern image through correction and normalization;

analyzing a similarity between the operation environment image and the camouflage pattern image using an artificial intelligence-based camouflage performance evaluation algorithm; and deriving and providing a quantitative camouflage performance value for an evaluation result of a camouflage performance for the camouflage pattern in the operation environment, wherein the artificial intelligence-based camouflage performance evaluation algorithm extracts feature information for the operation environment image and the camouflage pattern image and analyzes the similarity in color, pattern, or structure between the operation environment image and the camouflage pattern image based on the extracted feature information, wherein analyzing the similarity includes:

a color similarity analysis step calculating a color similarity by performing color comparison on each pixel between the operation environment image and the camouflage pattern image;

a pattern similarity analysis step calculating a pattern similarity by performing comparison on a color distribution in each space between the operation environment image and the camouflage pattern image; and a structural similarity analysis step extracting respective structural feature vectors of the operation environment image and the camouflage pattern image using a deep learning-based object recognition algorithm and calculating a structural similarity between the extracted structural feature vectors, wherein the deep learning-based object recognition algorithm used in the structural similarity analysis step uses a convolutional neural network (CNN) including a visual geometry group network (VGGNET) and a residual network (ResNET), and wherein the deep learning-based object recognition algorithm extracts respective feature maps of the operation environment image and the camouflage pattern image and compares the extracted feature maps through a Frobenius norm to measure the structural similarity between the operation environment image and the camouflage pattern image.

5. The method of claim 4, wherein performing the preprocessing includes:

converting the operation environment image and the camouflage pattern image, represented as red-green-blue (RGB) color space data, into XYZ color space data; and converting the XYZ color space data into Lab color space data.

6. The method of claim 4, wherein the color similarity analysis step includes measuring the color similarity by converting the operation environment image and the camouflage pattern image, represented as RGB color space data, into Lab color space data and then calculating a color difference based on a preset color difference equation between pixels matching between the operation environment image and the camouflage pattern image in the Lab color space data.

7. The method of claim 4, wherein the pattern similarity analysis step includes measuring a degree of reflection of a color distribution of the camouflage pattern image as compared with the operation environment image using any one index of a structural similarity index measure (SSIM) or a multiple SSIM (MSSIM) for measuring a structural similarity index.

8. The method of claim 4, wherein deriving and providing the quantitative camouflage performance value includes deriving and providing the quantitative camouflage performance value by multiplying each of similarities in color, pattern, or structure of the evaluation result of the camouflage performance by a preset weight and summating the weight-multiplied similarities.

* * * * *